(12) United States Patent
Virji et al.

(10) Patent No.: US 8,082,123 B2
(45) Date of Patent: Dec. 20, 2011

(54) INTERACTIVE DIAGNOSTICS HAVING GRAPHICAL PLAYBACK AND SOLUTION IMPLEMENTATION CAPABILITIES

(75) Inventors: Shafin A. Virji, Vancouver (CA); Kevin G. Gordon, Annacis Island Delta (CA); Clifton H. Bromley, New Westminster (CA); Eric G. Dorgelo, Port Moody (CA); Marc D. Semkow, Burnaby (CA); Douglas J. Reichard, Fairview, OH (US)

(73) Assignee: Rockwell Automated Technologies, Inc., Mayfield Heights, OH (US)

( * ) Notice: Subject to any disclaimer, the term of this patent is extended or adjusted under 35 U.S.C. 154(b) by 1514 days.

(21) Appl. No.: 11/239,960

(22) Filed: Sep. 30, 2005

(65) Prior Publication Data
US 2007/0078628 A1    Apr. 5, 2007

(51) Int. Cl.
*G06F 11/30* (2006.01)
(52) U.S. Cl. ...................................................... 702/183
(58) Field of Classification Search .................. 702/183
See application file for complete search history.

(56) References Cited

U.S. PATENT DOCUMENTS

| | | | |
|---|---|---|---|
| 6,567,709 B1 * | 5/2003 | Malm et al. ..................... 700/21 |
| 6,690,664 B1 * | 2/2004 | Khuc et al. ..................... 370/352 |
| 2006/0081703 A1 * | 4/2006 | Tran ............................. 235/382 |
| 2006/0161268 A1 * | 7/2006 | Frensch et al. ................... 700/1 |

* cited by examiner

*Primary Examiner* — Sujoy Kundu
(74) *Attorney, Agent, or Firm* — Turocy & Watson, LLP; Alexander R. Kuszewski; John M. Miller (57) ABSTRACT

A system(s) and method(s) that facilitates diagnosing a HMI system and automatically applying a solution to correct and/or update the HMI system. According to a feature is an interactive diagnosis system for an human machine interface (HMI) system. The interactive diagnosis system includes a data capture component that captures HMI system information and a diagnostic component that accepts a user input relating to an HMI system and receives the HMI system information from the data capture component. The user input can be communicated through an interactive voice response system. Also included in the interactive diagnosis system is an engine component that receives the user input and based in part on the captured HMI system information selectively requests diagnostic and solution information from a data source and automatically applies the solution to the HMI system.

19 Claims, 10 Drawing Sheets

INTERACTIVE DIAGNOSTICS HAVING GRAPHICAL PLAYBACK AND SOLUTION IMPLEMENTATION CAPABILITIES

TECHNICAL FIELD

The subject disclosure relates generally to industrial automation systems and more particularly to human machine interfaces (HMIs).

BACKGROUND

Complete or partial automation in factories, manufacturing facilities, and the like is possible through utilization of industrial control systems. A logic processor, such as a programmable logic controller (PLC) lies at the core of the industrial control system. PLCs can be programmed to operate manufacturing processes through logic programs and/or routines. These programs can be stored in memory and generally are executed by the PLC in a sequential manner, although instruction jumping, looping, and interrupt routines are also common. Industrial control systems typically include a plurality of input and output (I/O) modules communicatively coupled to the PLC through a backplane that interferes at a device level to switches, contactors, relays, solenoids and sensors, among other devices. Accordingly, such control systems are optimized to control and monitor industrial processes, machines, manufacturing equipment, industrial plants, and the like.

Human machine interfaces (HMIs) or simply user interfaces are important to the successful operation and maintenance of industrial automation devices including control systems and associated equipment and/or machinery. User interfaces provide the essential communication link between operators and automation devices. This link allows operators to, among other things, setup and control devices and receive feedback by monitoring device status and health during operation. Without such user interfaces, achieving high-level industrial automation would be difficult if not impossible.

When a user has a problem with their HMI system, the user generally contacts technical support staff associated with a software vendor, for example, through, for example, placing a telephone call. The technical support staff queries the user for information through a series of questions designed to assist the technical support staff in diagnosing the problem experience by the user. The user may need to create or generate a log file and send it to the technical support staff. If the problem cannot be diagnosed in such a manner, the technical support staff might attempt to simulate the problem at the support site by attempting to reproduce the HMI system operating conditions and potential faults. The user may assist in such a simulation process by running or executing various debugging utilities on the user HMI system. If the problem cannot be reproduced and/or solved, a software engineer or other service technician may be dispatched to the user site to diagnose and solve the problem in the field. In some situations, software that includes a patch or fix to a problem is installed on a removable medium and physically transported and installed on the machine. The various processes of diagnosing and repairing a problem can result in excessive downtime, loss of productivity, and considerable costs can be involved for the user and the technical support staff and/or software vendor.

To overcome the aforementioned deficiencies, there is a need to provide the software vendor a means to quickly and easily interact with the user HMI system environment for quick and accurate feedback of the operating conditions and machine faults. There is a also a need to provide the user a means to interact directly into the software vendor solution database for self-help or auto-help capability mitigating the necessity of seeking assistance from technical support staff.

SUMMARY

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

According to a feature is an interactive diagnosis system that includes a data capture component to capture HMI system information and a diagnostic component that accepts a user input relating to the HMI system. The system can receive the HMI system information from the data capture component. The user input can be communicated through an interactive voice response system. Also included in the interactive diagnosis system is an engine component that receives the user input and based in part on the captured HMI system information selectively requests diagnostic and solution information from a data source and automatically applies the solution to the HMI system.

According to another embodiment is a method for interactive diagnosis and solution implementation in an industrial environment. The method includes receiving a diagnostic request and retrieving HMI system data. The diagnostic request can be from a user through an interactive voice response system. The method further includes requesting diagnostic and solution information from an external source, such as a software vendor database. In an embodiment, the software vendor database does not include the diagnostic and solution information, the method automatically contacts technical support for the information. The method can further include automatically applying the solution to the HMI system to resolve the diagnostic request.

To the accomplishment of the foregoing and related ends, one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component," "module," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

As used herein, the terms to "infer" or "inference" refer generally to the process of reasoning about or inferring states of the system, environment, and/or user from a set of observations as captured through events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the subject detailed description.

Figure 1:
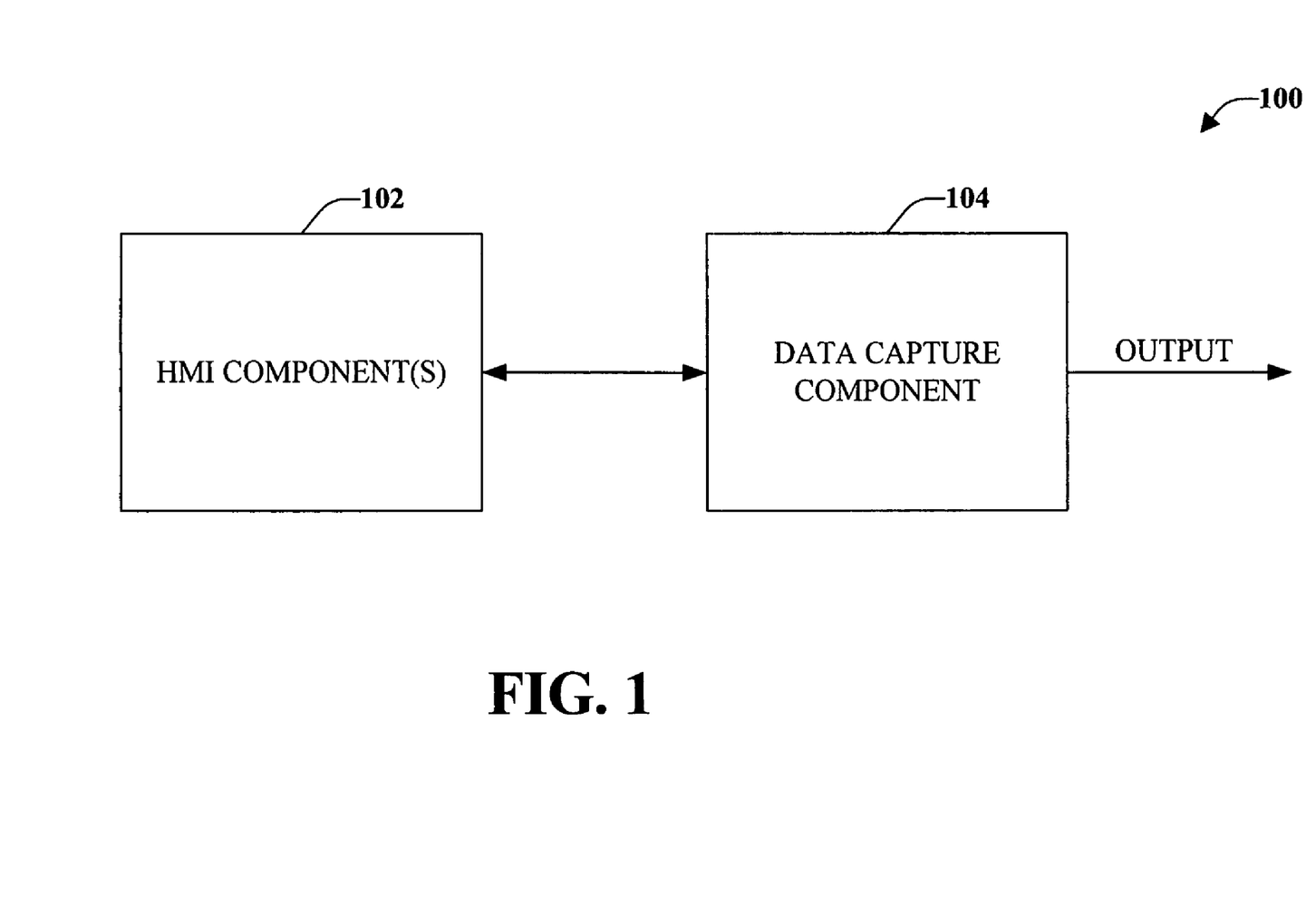
FIG. 1 illustrates an HMI system configured to capture and retain data regarding various system parameters.

With reference now to the drawings, FIG. 1 illustrates an HMI system 100 configured to capture and retain data regarding various system parameters. System 100 includes HMI component(s) 102 that interface with one or more data capture component 104. The HMI component(s) 102 can be components of the HMI system 100 that are at various locations. For example, an HMI system 100 can be employed for use at different facilities and such facilities can be in different geographic locations (e.g., city, state, country). Regardless of the location of either the HMI component(s) 102 and/or the data capture component 104, communication can be established through a plurality of wired and/or wireless communication links and all such communication means are intended to fall within the scope of the detailed description and appended claims.

As aspects and parameters of the HMI component(s) 102 are configured, modified, etc. the data capture component 104 receives or requests such information. The data capture component 104 (also referred to as an event database) can record and/or store information regarding what a user has done or changed over a period of time and further can include code execution, user interaction through instructions and/or graphical/video data. The data capture component 104 can also include detailed information about the environment in which the user and HMI system is operating. The environment can include the various servers and their locations, the devices and their location, the person that is logged in and where the software components are located as well as the state or portion of code currently being executed. The information can be periodically sent from an HMI component 102 to the data capture component 104. In other embodiments, the data capture component 104 periodically polls for and requests information regarding changes to the HMI component(s) 102. In still other embodiments, the HMI component(s) 102 automatically transmit such information to the data capture component 104.

The data capture component 104 can be configured to retain such information in a readily accessible format. For example, the data capture component 104 can retain such information in a memory and/or some other medium that can store information. By way of illustration, and not limitation, the data capture component 104 can include nonvolatile and/or volatile memory. Suitable nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

According to some embodiments, the data capture component 104 can periodically remove or delete information based on predefined criteria. For example, the information relating to configuration, modification, etc. can be destroyed after a period of time (e.g., days, weeks, years) or the information can be retained indefinitely. A retention period can be based on a plurality of factors including system resources, amount and number of modifications to the system, etc.

The data capture component 104 can be configured to output information relating to the HMI component(s) upon a request from, for example, a diagnostic component or diagnostic engine configured to access the functionality of the HMI system 100. For example, if a failure or other problem with an HMI system 100 is detected and communicated to a diagnostic component, the data capture component 104 can provide historic data relating to modifications, operating condition, etc. that may have contributed and/or caused such failure. Access to such data allows a diagnostic component to locate the fault condition or infer a fault based upon various system 100 parameters, reducing troubleshooting and/or repair time and resources. The access to the HMI system 100 information can be performed through a secure channel though the data capture component 104. In such a manner, breach of system 100 integrity and security is minimized while allowing technical service technicians to obtain system 100 information.

Figure 2:
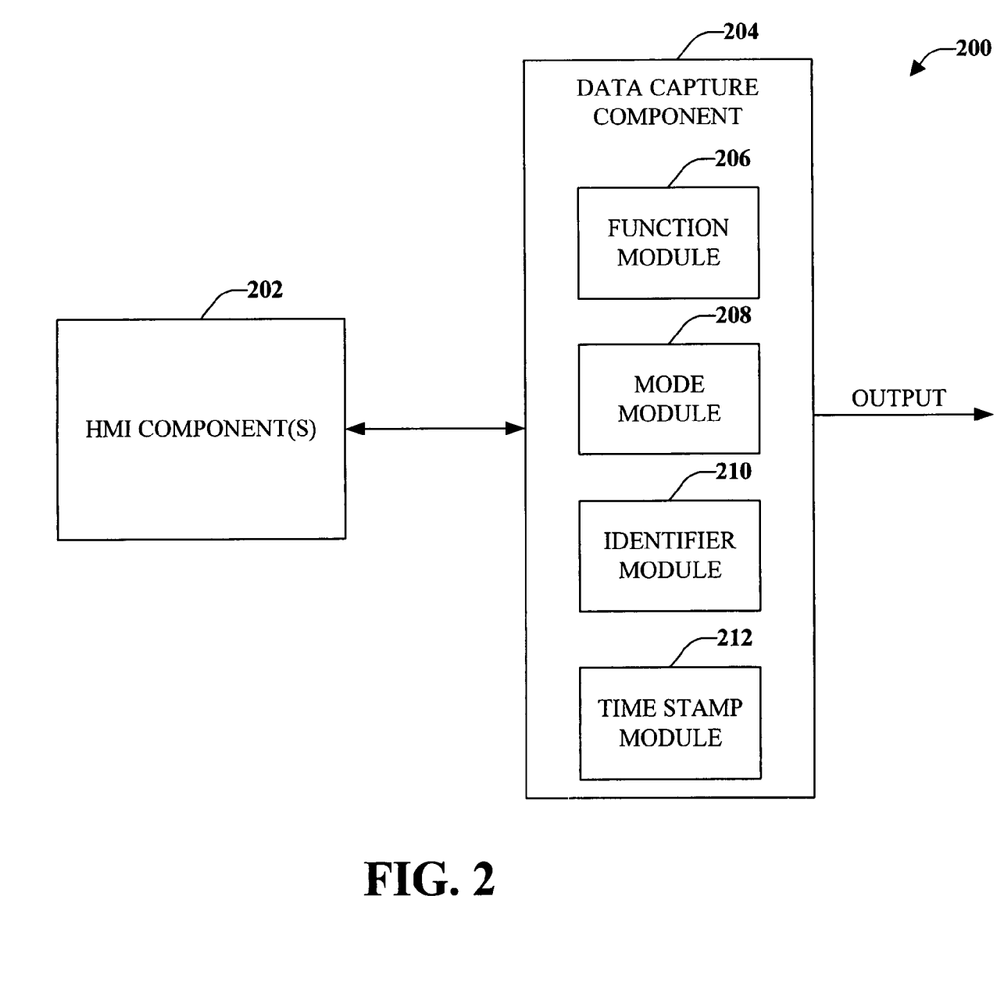
FIG. 2 illustrates an HMI system configured to monitor and record system information.

FIG. 2 illustrates an HMI system 200 configured to monitor and record system information. HMI system 200 includes HMI component(s) 202 that can be located at a plurality of geographic locations and a data capture component 204 configured to monitor modifications and other parameters to the system 200. Data capture component 204 can both receive data from the HMI component(s) 202 and send information to the HMI component(s) 202 though a communication link (either wirelessly or through a wired link).

Data capture component 204 can include a plurality of modules to track and retain system 200 information. These modules can include a function module 206, a mode module 208, an identifier module 210, and/or a time stamp module 212. The data capture component 204 may include additional modules and/or may not include all of the modules discussed above. In addition or alternatively, the modules can be rearranged and/or combined.

The function module 206 is configured to capture the functionalities associated with the HMI system 200. The functionalities can include the operational parameter(s) of the machine (e.g., what the machine is doing). Other functionalities include the operating conditions of the user and/or system 200 (e.g., external conditions in the plant in which the machine is located).

The mode module 208 is configured to monitor the particular state or stage of programs being executed by the system 200. For example, if the machine is experiencing a particular problem, the mode module 208 can monitor a software code to determine the line of codes which may be contributing to the experienced problem. According to another aspect, the mode module 208 can detect a revision or modification level of software or hardware components of the system 200.

An identifier module 210 associated with the data capture component 204 can be configured to identify a particular user of the HMI system 200 as well as the particular machine or component experiencing the problem. For example, a user, in order to operate the HMI system 200 and/or to alter configurations associated with the system 200 may need to log on with a unique user identification (id) and/or user password. With a user id the particular user can be identified, thus if there are problems with the system 200 that can be traced to a particular user, such user can be contacted for more information regarding any changes or experiences that user had with the system 200. An unique user id can also mitigate the occurrence of unintentional and/or malicious changes to system 200. It should be understood that other identification techniques could be utilized, such as biometric authentication that utilizes physical characteristic unique to individuals. According to other embodiments, user identification is not utilized and/or tracked.

To ascertain and understand a current condition of the system 200 in the case of a fault, it might be desirable to track changes and/or operation of the system and the date and time such changes or operation occurred. This information can be obtained and maintained utilizing a time stamp module 212. In some embodiments, the time stamp module 212 can record the date and/or time when a modification occurred along with the particular modification, thus providing detailed information. In other embodiments, the time stamp module 212 can record a date and/or time when such information is communication to the data capture component 204. For example, if the data capture component 204 queries for (or receives) information daily, the time stamp module 212 can associate the date received with the system 200 information. In such a manner, the modification or other parameter can be traced to a particular day and a determination can be made whether the modification and/or parameter caused and/or contributed to a particular fault condition (e.g., how soon after the modification did the fault occur).

Figure 3:
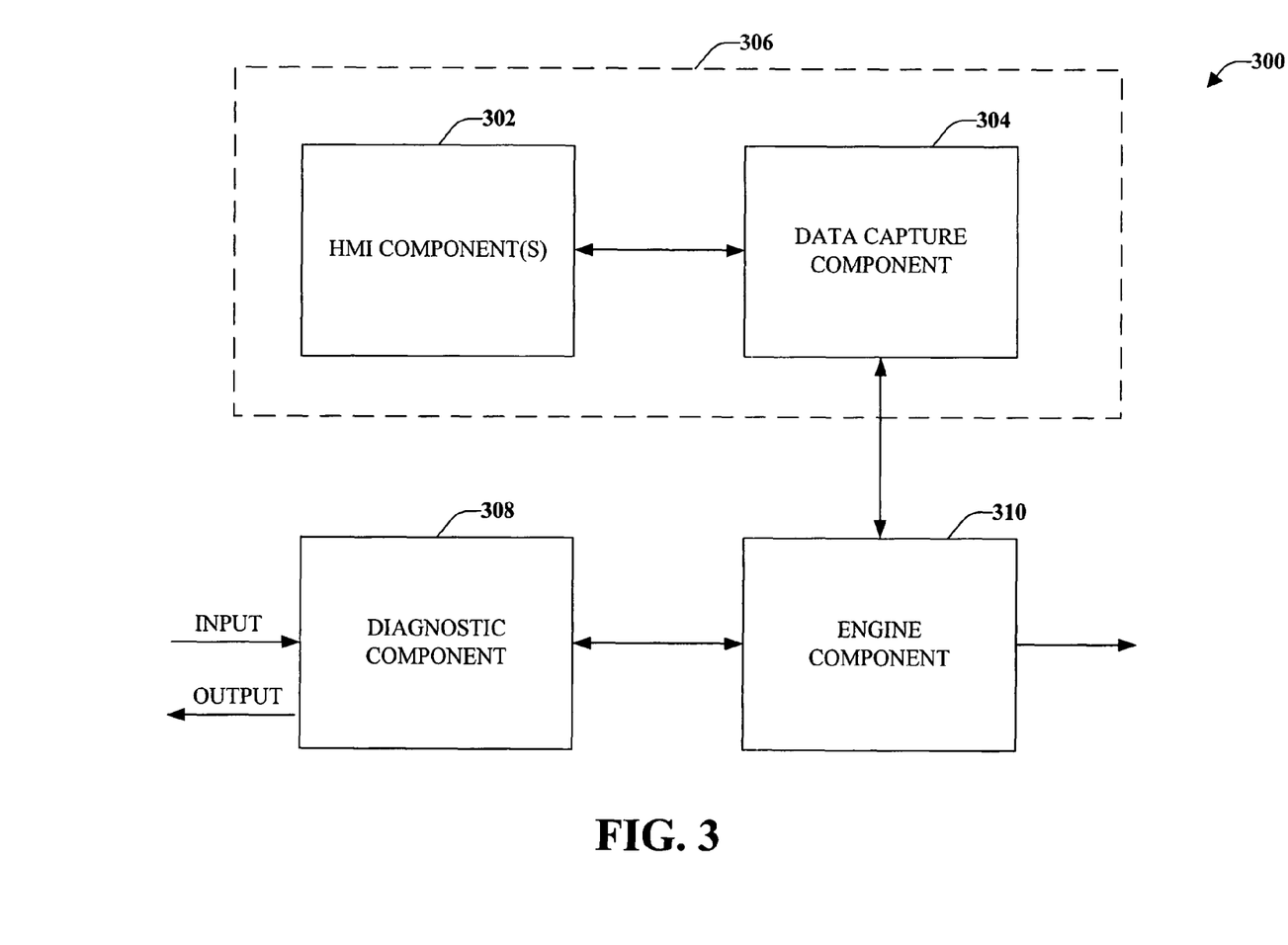
FIG. 3 illustrates an interactive diagnostic system having graphical playback and solution implementation capabilities.

With reference now to FIG. 3, illustrated is an interactive diagnostic system 300 having graphical playback and solution implementation capabilities. System 300 includes HMI component(s) 302 and one or more data capture component 304, that operate in a manner similar to that shown and described in the above figures. The HMI component(s) 302 and data capture component 304 are included in an HMI system 306.

System 300 also includes a diagnostic component 308 that is in communication with an engine component 310 that is in communication with the data capture component 304. The diagnostic component 308 and/or engine component 310 can be located remote from the HMI system 306. For example, diagnostic component 308 and/or engine component 310 can be isolated from the HMI system 306 operating in a plant environment. The interface component 308 receives an input from a user and/or entity (e.g., the Internet, another system, a computer, . . . ), hereinafter referred to as user. For example, a user experiencing a problem with HMI system 302, may desire to have such problems diagnosed and, therefore, interacts with the diagnostic component 308 to facilitate HMI system 306 repair.

Diagnostic component 308 can provide various types of user interfaces. For example, the diagnostic component 308 can provide a graphical user interface (GUI), a command line interface, and the like. For example, a GUI can be rendered that provides a user with a region or means to load, import, read, etc. an HMI system fault condition, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with the engine component 310 by entering the information into an edit control.

The user can also interact with the engine component 310 through the diagnostic component 308 to select and provide information through various devices such as a mouse, a roller ball, a keypad, a keyboard, a pen and/or voice activation, for example. Typically, a mechanism such as a push button or the enter key on the keyboard can be employed subsequent entering the information in order to initiate information conveyance. However, it is to be appreciated that the system 300 is not so limited. For example, merely highlighting a check box can initiate information conveyance. In another example, a command line interface can be employed. For example, the command line interface can prompt (e.g., through a text message on a display and an audio tone) the user for information by providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

The diagnostic component 308 interfaces with an engine component 310 that is configured to search for a means to diagnose and/or repair an HMI system 302 fault. The engine component 310 retrieves information from the data capture component 306 through a secure communication link. The information received from the data capture component 306 is utilized by engine component 310 to diagnose the problem and/or automatically apply a patch or fix to the HMI system 302. If necessary, the engine component 310 can output information to query additional sources to diagnose and fix the HMI system 302. Additional sources include a software vendor database and/or communication directly with technical support personnel.

Figure 4:
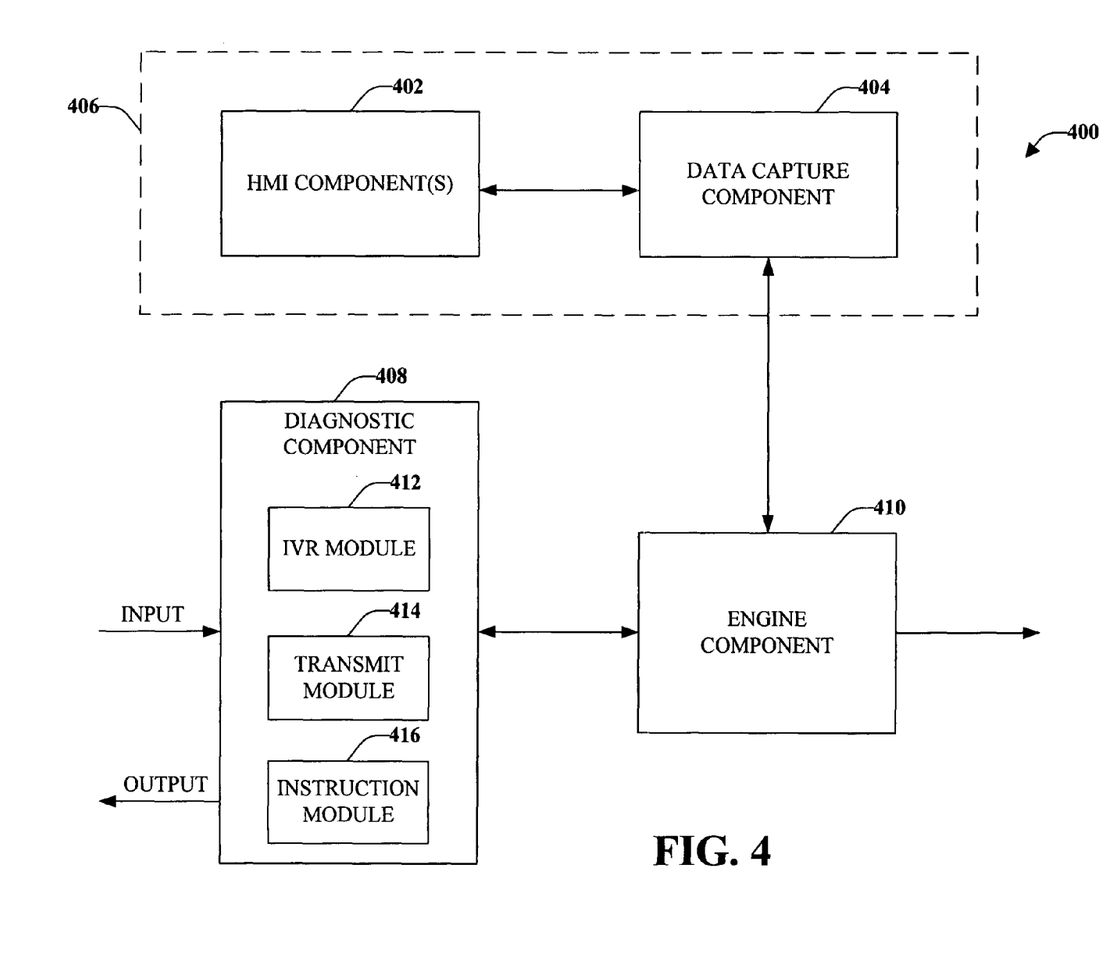
FIG. 4 illustrates an interactive diagnostic system that facilitates solution implementation strategies.

FIG. 4 illustrates an interactive diagnostic system 400 that facilitates solution implementation strategies. System 400 includes HMI component(s) 402 that interface with a data capture component 404 that obtains and maintains information concerning HMI component(s) 402 information. The HMI component(s) 402 and data capture component 404 are included in an HMI system 406. When a problem is experienced with the HMI system 406, a user inputs the information into a diagnostic component 408 that interfaces with an engine component 410. The diagnostic component 408 includes an interactive voice response (IVR) module 412, a transmit module 414 and/or an instruction module 416. The diagnostic component 408 can include additional modules and/or may not include all of the modules discussed above. In addition or alternatively, the modules can be arranged in a different order and/or combined.

A user can enter an input to the diagnostic component 408 through the IVR module 412 that is configured to allow a user to interact with the system 400. The user can input information using a touch-tone telephone or computer to interact with the engine component 410 through the diagnostic component 408. The user can also acquire information from the engine component 410. In such a manner, the user contacts the engine component 410 for diagnosis of a problem with the HMI system 406.

The user can input information into a computer, through the IVR module 412, and utilize voice communication to talk to the computer by saying, for example, "I have an alarm on X machine, what does it mean?" This information is relayed to the transmit module 414 where it is transformed into a machine understandable set of instructions, through for example instruction sets. This can be achieved though any known techniques, for example, key words, terms, or phrases, can be recognized, decoded, and/or transferred into machine understandable (readable) code.

The transmit module 414 communicates the machine instructions to the engine component 410 that obtains further information regarding the machine, environment, and other operating parameters. Provided that the engine component 410 can diagnose the problem(s), it sends information to the diagnostic component 408 and the instruction module 416 can automatically apply a patch or other means to fix the HMI system 406, by, for example uploading a solution or potential work-around. For example, the software vendor can interact with the engine component 410 to obtain additional information regarding how the user got into the problem, the events that took place at substantially the same time as the problem. In another embodiment, the instruction module 416 can notify the user if there is not a problem or if some other action must be taken. For example, if the user is pressing the incorrect button to achieve a particular function from the machine, the instruction module 416 can instruct the user of the incorrect button and suggest how to perform the desired function. The engine component 410 can diagnose the problem through internal means, such as an internal database that contains various symptoms and solutions, or through external means, such as a database maintained by a software vendor and/or through direct communication with the technical support staff.

Figure 5:
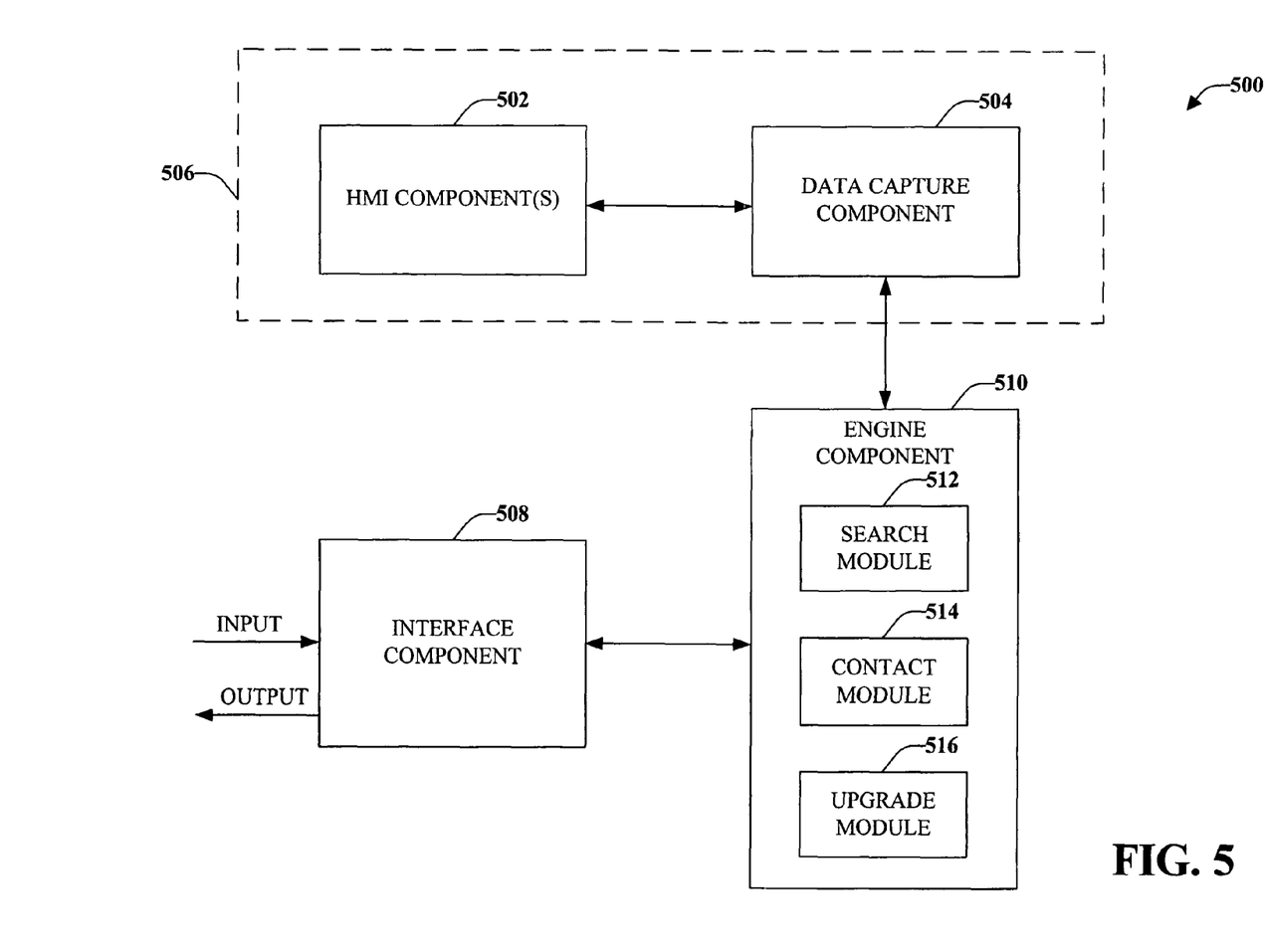
FIG. 5 illustrates an interactive diagnostic system configured to automatically diagnose and correct system problems.

With reference now to FIG. 5, illustrated is an interactive diagnostic system 500 configured to automatically diagnose and correct system problems. System 500 includes HMI component(s) that are monitored for modifications, etc. by a data capture component 504, both including within an HMI system 506. The information retained by the data capture component 504 is utilized when a user reports a system failure through a diagnostic component 508 by means of an interactive voice response, for example. The diagnostic component 508 relays the reported failure to an engine component 510 configured to search for solutions to the failure and automatically correct the detected failures. The engine component 510 can be located at a plurality of physical locations (e.g., at a customer's site) but does not have to be physically located at the plant. The engine component 510 includes a secured channel to the HMI system 506 that mitigates the occurrence of unauthorized personnel gaining access to the system.

Engine component 510 includes a search module 512, a contact module 514, and/or an upgrade module 516. The search module 512 is configured to access databases internal to the engine component 510 and databases external to the engine component 510 to obtain diagnostic information relating to a machine failure. The search module 512 can obtain information from the data capture component 504 to determine the machine conditions and/or operating parameters at substantially the same time as the reported failure. The machine conditions leading up to the failure can also be obtained to assist in diagnosing the system 506 failure.

The search module 512 can include a database or other means of retrieval internal to the engine component 510 that includes known fault conditions relating to the HMI system 506. In addition or alternatively, the search module 512 can request and obtain diagnostic information automatically from a software vendor knowledge database if the diagnosis cannot be performed internal to the engine component 510. If the information is available though interaction with the software vendor knowledge database, the engine component 510 automatically upgrades the system through the upgrade module 516.

Sometimes the diagnostic and/or repair information is not available through the software vendor knowledge database and technical support needs to be contacted. The contact module 514 automatically notifies the software vendor technical support staff without needing the user to perform the function. The software vendor can be notified and a solution implemented without user interaction. In another embodiment, the technical support staff is notified and a communication is established with the user. Contacting the technical support staff can be performed in the background while the search module 512 is continuously accessing data.

The upgrade module 516 automatically upgrades or repairs the system without needing user interaction. In an embodiment, the upgrade module 516 can monitor the system 506, through the data capture component 504, and make a determination whether the solution applied to the system does correct the problem. If not, the engine component 510 and/or technical support can continue to search for a solution in a similar manner to that described above.

In some embodiments, the engine component 510 can interface with the HMI system 506 to perform a function, such as applying a patch to correct the problem. In another embodiment, the engine component 510 can request an authorization from appropriate personnel prior to the change being applied to the HMI system 506. In a further embodiment, the engine component 510 can reconfigure the HMI system 506 to diagnose and correct the problem. In other embodiments, the engine component 510 can instruct the HMI system 506 to perform a debugging function to further assist in diagnosing a system 506 failure. It is to be understood that the functionality of the engine component 510 is dependent upon preauthorization to perform various functions. In some situations a user might not desire intrusive changes (e.g., reconfiguring system 506), as such the engine component 510 can be restricted to recommend a change and prompting the user for confirmation before the change is applied. Other techniques to restrict the operation of the engine component 510 can be applied, based on user-defined criteria and parameters.

Figure 6:
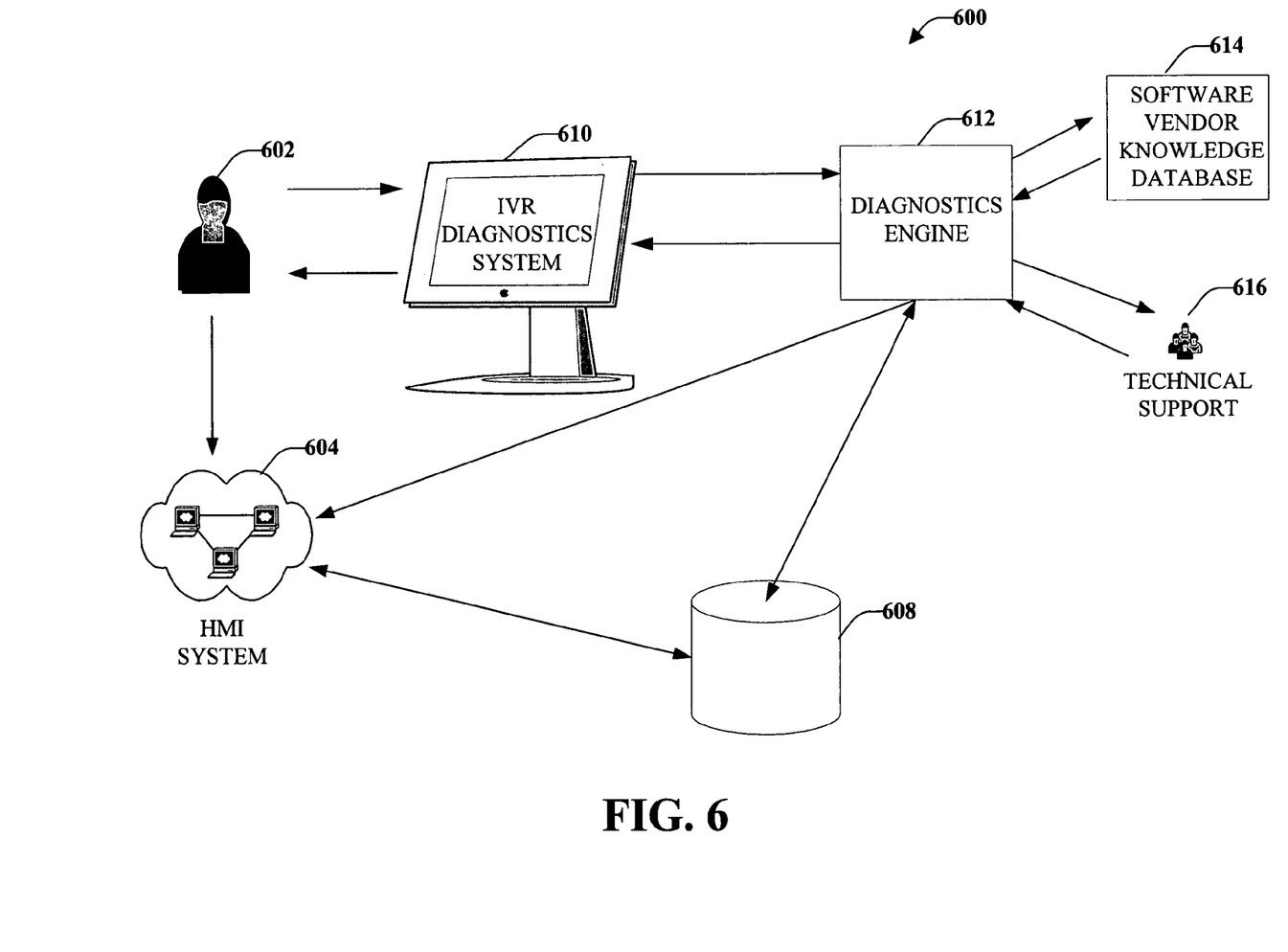
FIG. 6 illustrates a representation of an interactive diagnostic system utilizing the disclosed techniques.

Referring now to FIG. 6, illustrated is a representation of an interactive diagnostic system utilizing the disclosed techniques. A user 602 interacts with an HMI system 604 whose components can be dispersed thought a plurality of geographic areas. The HMI system 604 interacts with a database 608 to provide logging of data relating to events occurring in the HMI system 604, information relating to the HMI system 604, and/or the operating environment of the HMI system 604.

The user 602 can interact with an interface, such as an interactive voice response (IVR) diagnostic system 610, through voice commands relayed trough a computer or telephone. The IVR diagnostics system 610 sends diagnostics information to a diagnostics engine 612. The diagnostics engine 612 retrieves information from the database 608 and/or directly from the HMI system 604. In order to diagnose the problem, the diagnostics engine 612 contacts a software vendor knowledge database 614 and communicates the potential problem. If the solution is available through the software vendor knowledge database 614, the solution is communicated to the diagnostics engine 612. The diagnostics engine 612 can communicate the solution to the user 602, through the IVR diagnostics system 610. In other embodiments, the diagnostics engine 612 communicates the information to the database 608 and/or can apply the patch, solution and/or workaround directly to the HMI system 604.

If a solution is not available through the software vendor knowledge database 614, the diagnostics engine 612 automatically contacts technical support staff 616. The technical support staff 616 can respond to the request and suggest a patch and/or solution without the user 602 being involved with such diagnosis. If further information is necessary, the user 602 can be contacted through the IVR diagnostics system 610, such as through a voice request for further information. The software database 614 can further apply system 604 upgrades through the database 608 and/or diagnostic engine 612.

Figure 7:
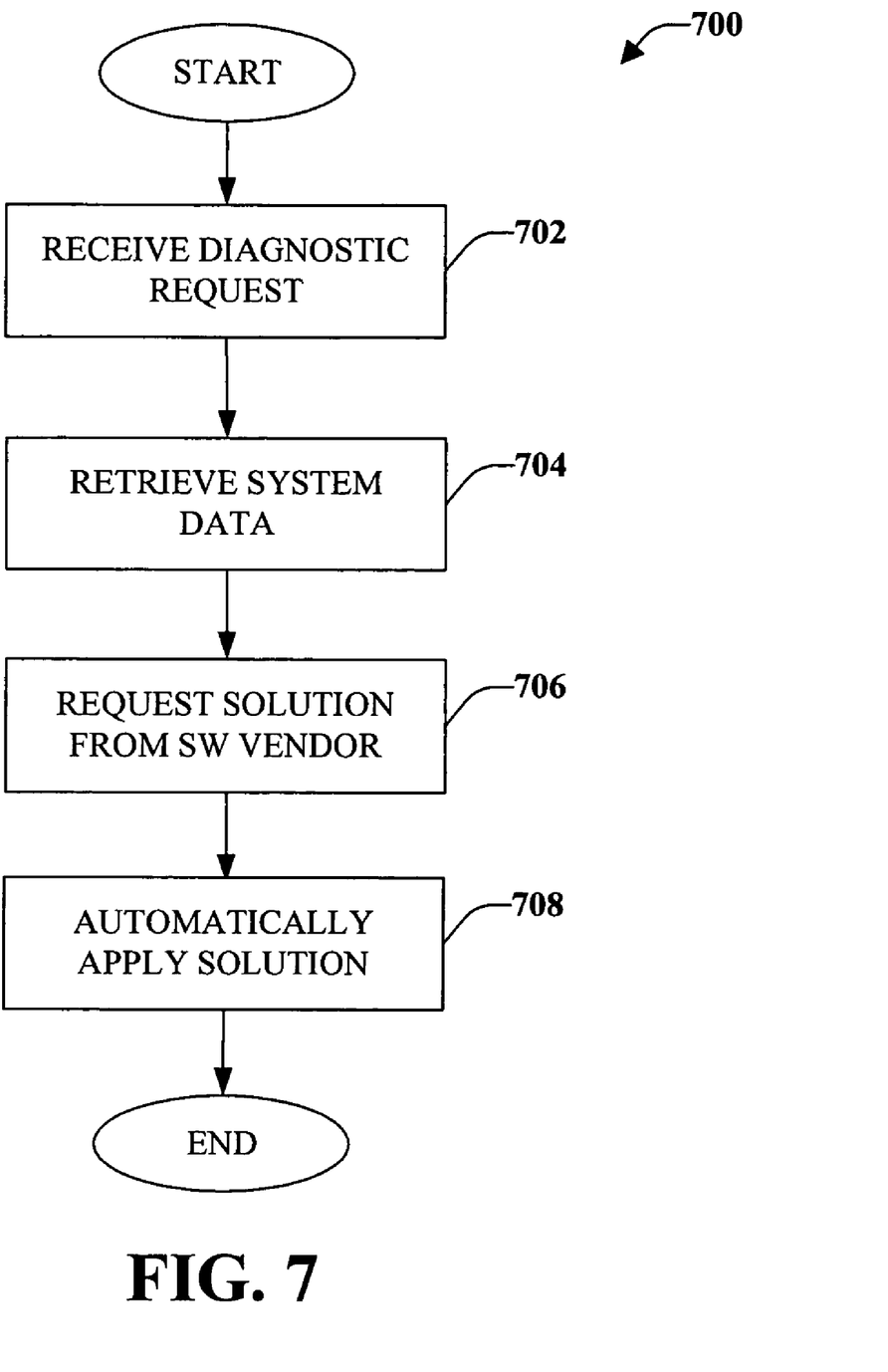
FIG. 7 illustrates a methodology for interactive diagnostic and solution implementation according to some embodiments presented herein.
Figure 8:
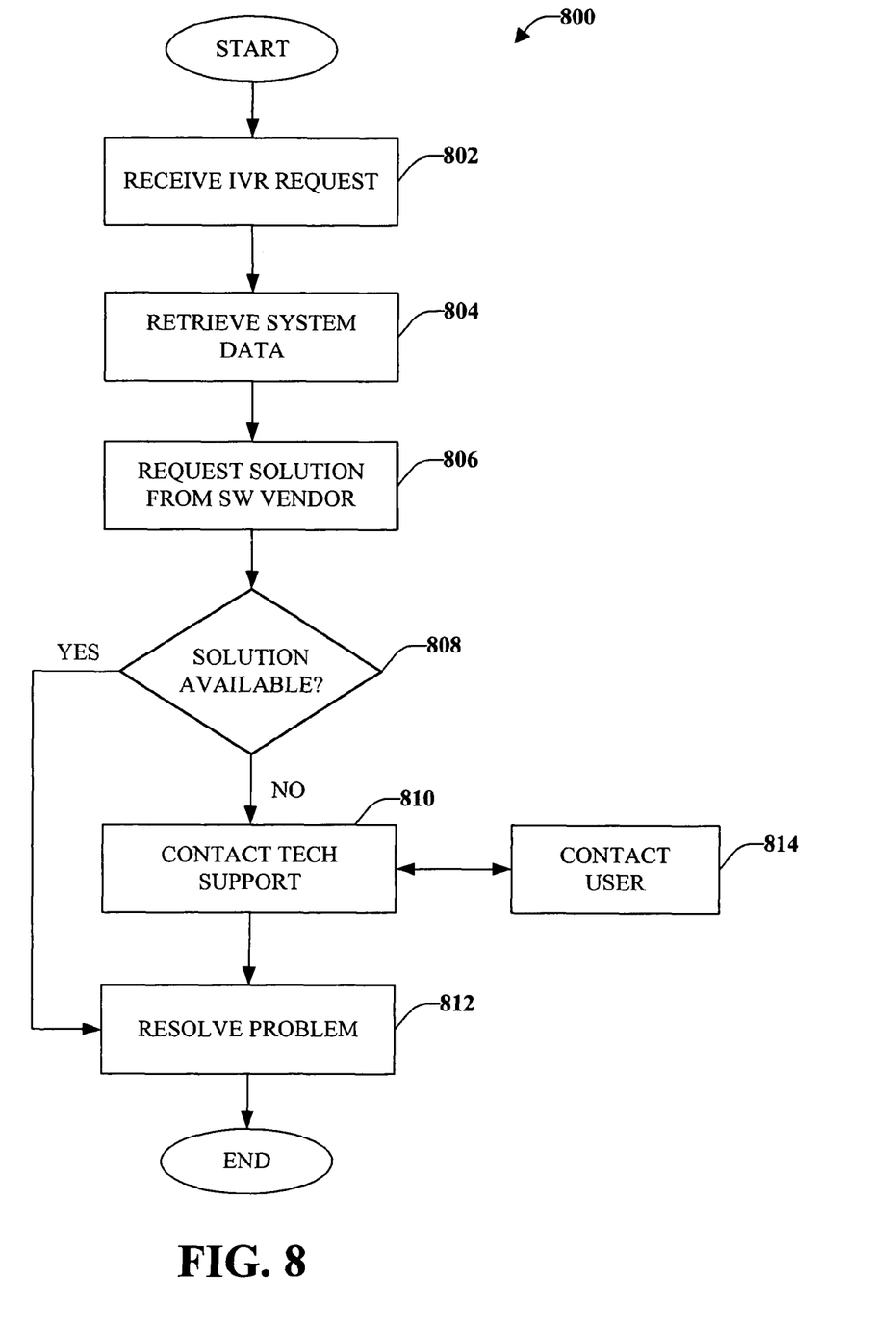
FIG. 8 illustrates a methodology for receiving a diagnostic request and automatically implement solutions utilizing a plurality of sources.

In view of the exemplary systems shown and described above, methodologies, which may be implemented in accordance with one or more aspects of the disclosed embodiments, will be better appreciated with reference to the diagram of FIGS. 7 and 8. While, for purposes of simplicity of explanation, the methodologies are shown and described as a series of acts (or function blocks), it is to be understood and appreciated that the methodologies are not limited by the order of acts, as some acts may, in accordance with these methodologies, occur in different orders and/or concurrently with other acts from that shown and described herein. Moreover, not all illustrated acts may be required to implement a methodology in accordance with one or more aspects of the disclosed embodiments. It is to be appreciated that the various acts may be implemented by software, hardware, a combination thereof or any other suitable means (e.g. device, system, process, component) for carrying out the functionality associated with the acts. It is also to be appreciated that the acts are merely to illustrate certain aspects presented herein in a simplified form and that these aspects may be illustrated by a lesser and/or greater number of acts. Moreover, not all illustrated acts may be required to implement the following methodologies. Those skilled in the art will understand and appreciate that a methodology could alternatively be represented as a series of interrelated states or events, such as in a state diagram.

Initially referring to FIG. 7, illustrated is a methodology 700 for interactive diagnostic and solution implementation according to some embodiments presented herein. The method 700 begins at 702 where a request for diagnostic information is received. This request can be from a user and/or entity (e.g., the Internet, another system, a computer, . . . ). The request can be through any interactive means including, but not limited to, a keyboard input, a pushbutton phone, an interactive voice response system, etc. The diagnostic request relates to an HMI system for which the user is experiencing a problem, failure, or other reasons for which upgrade, diagnosis, and/or other information is desired.

System data is retrieved through a secured communication, at 704, and includes parameters associated with the HMI system including modifications, operating conditions, and other system information. This information is utilized to diagnose the problem being experienced and/or evaluate system operating and/or parameters. The information relating to the particular problem and/or machine is sent to the software vendor (sw) along with a request for a solution to the problem that can be implemented. The vendor knowledge database is searched for information to upgrade, diagnose and/or repair system. When the solution is received, the method continues, at 708, and the solution is automatically applied to the HMI system without necessitating further interaction from a user and/or vendor.

FIG. 8 illustrates a methodology 800 for receiving a diagnostic request and automatically implement solutions utilizing a plurality of sources. The method 800 beings at, 802, when an interactive voice response (IVR) request is received from a user experiencing problems with (or requesting upgrades and/or information) an HMI system. Information relating to the particular problem and/or HMI component or machine is retrieved at 804. The information can include machine identification, user identification, code or instruction information, operating conditions, as well as other parameters associated with the machine. The information can be maintained in a database that is associated with the HMI system. At substantially the same time of the problem and/or machine is identified, a request for diagnosis and correction is requested from the software (sw) vendor, at 806.

At 808 a determination is made whether a solution to the problem is available. If there is a solution available, "YES" the method continues at 812 where the problem is resolved automatically. If the solution is not available "NO" the method continues at 810 where technical support personnel are automatically contacted. The technical support personnel can further diagnose and research the problem. Additional information may also be needed from the user, at 814, from whom the IVR request was received. In such a manner, the user does not have to interact with technical support personnel unless additional information is necessary in order to properly diagnose the problem. The problem is automatically resolved, at 812. In another embodiment, the solution can be communication to the user, through the IVR, and the user manually applies the solution.

Figure 9:
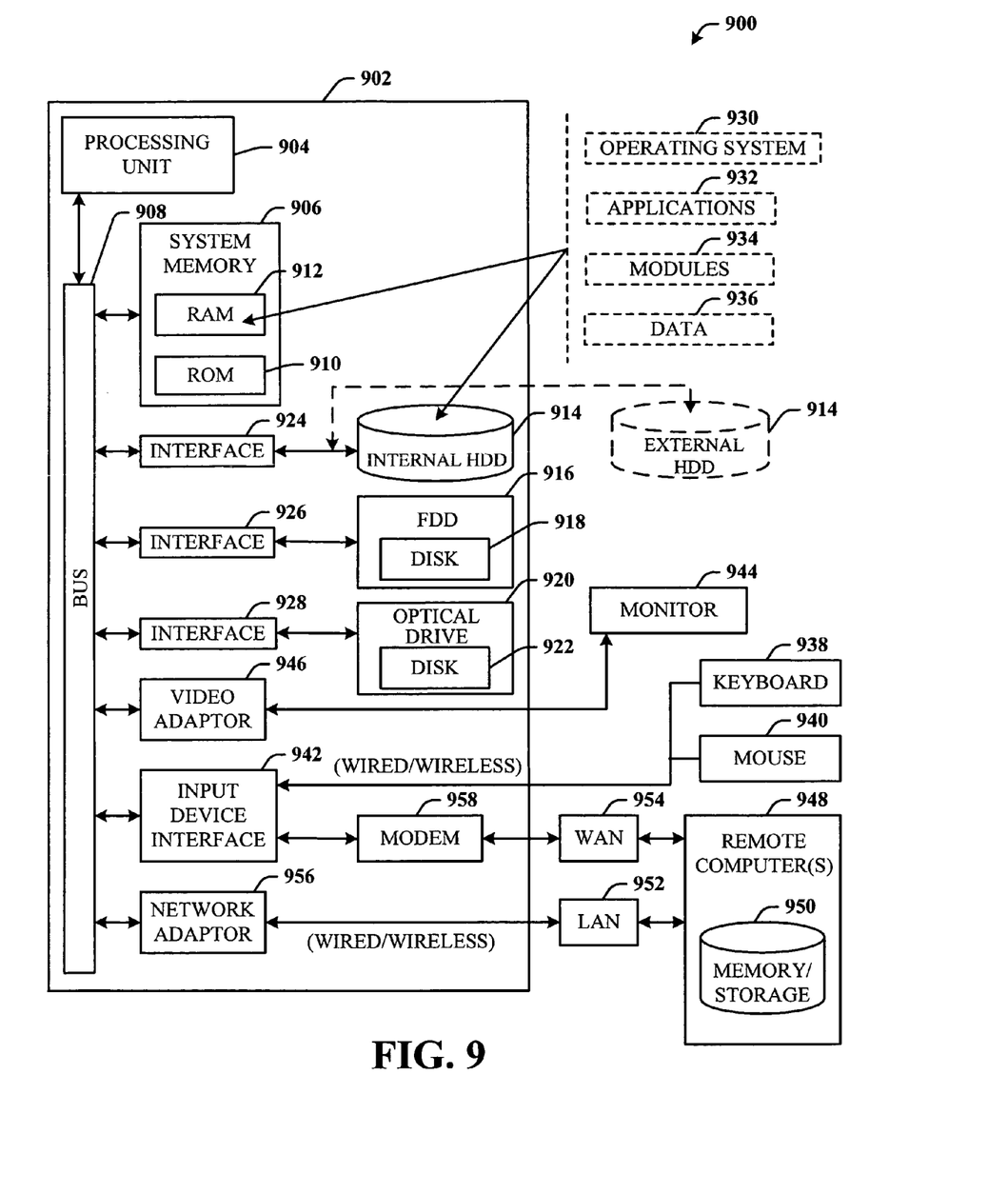
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects disclosed, FIG. 9 and the following discussion are intended to provide a brief, general description of a suitable computing environment 900 in which the various aspects can be implemented. While the one or more embodiments have been described above in the general context of computer-executable instructions that may run on one or more computers, those skilled in the art will recognize that the embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the disclosed embodiments includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the disclosed embodiments.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the subject embodiments.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the embodiments can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 by an interface, such as a video adapter 946. In addition to the monitor 944, a computer typically includes other peripheral output devices (not shown), such as speakers, printers, etc.

The computer 902 may operate in a networked environment using logical connections through wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 through the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
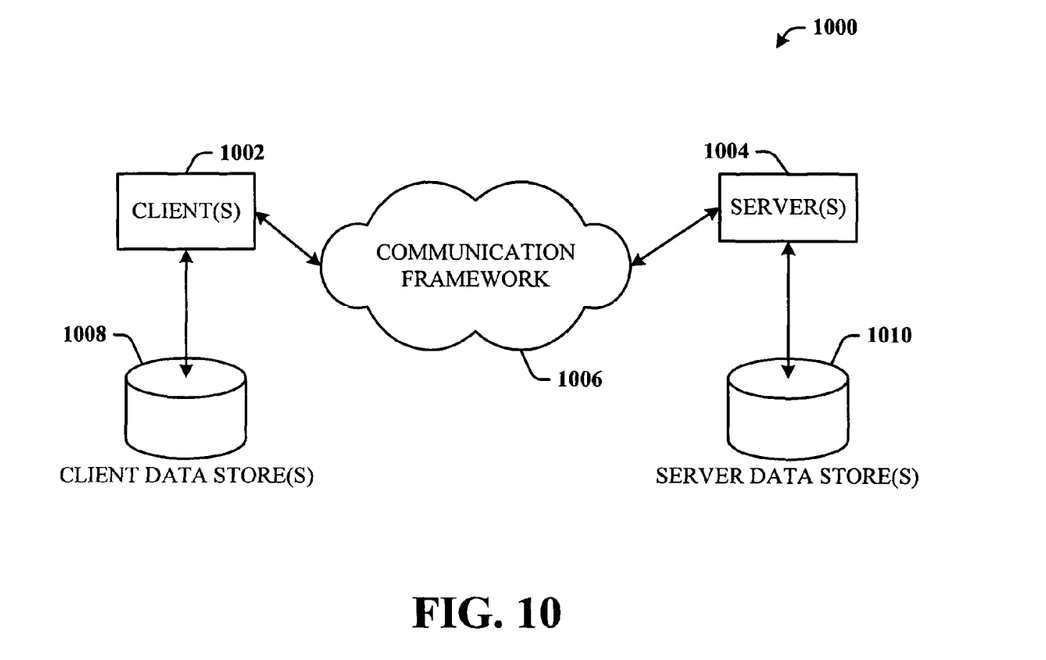
FIG. 10 illustrates a schematic block diagram of a computing environment that can be utilized in accordance with the disclosed embodiments.

Referring now to FIG. 10, there is illustrated a schematic block diagram of an exemplary computing environment 1000 in accordance with the disclosed embodiments. The system 1000 includes one or more client(s) 1002. The client(s) 1002 can be hardware and/or software (e.g., threads, processes, computing devices). The client(s) 1002 can maintain information by employing the embodiments, for example.

The system 1000 also includes one or more server(s) 1004. The server(s) 1004 can also be hardware and/or software (e.g., threads, processes, computing devices). The servers 1004 can house threads to perform transformations by employing the disclosed embodiments, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated by a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the one or more embodiments. It is, of course, not possible to describe every conceivable combination of components or methodologies for purposes of describing the subject embodiments, but one of ordinary skill in the art may recognize that many further combinations and permutations of the disclosed embodiments are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed embodiments. In this regard, it will also be recognized that the embodiments include a system as well as a computer-readable medium having computer-executable instructions for performing the acts and/or events of the various methods presented herein.

In addition, while a particular features may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. An interactive diagnosis system, comprising:
a data capture component that captures HMI system information;
a diagnostic component that accepts a user input relating to an HMI system and receives the HMI system information from the data capture component and further provides an instruction to a user to implement a solution for the HMI system; and
an engine component that receives the user input and based in part on the captured HMI system information selectively requests diagnostic information and solution information from a data source, the engine component is configured to automatically apply a solution to the HMI system.

2. The system of claim 1, the diagnostic component includes an interactive voice response (IVR) system.

3. The system of claim 1, the data source is one of a vendor database and a technical support center.

4. The system of claim 3, the engine component contacts the technical support center if the vendor database does not include the diagnostic or solution information.

5. The system of claim 1, the engine component interfaces with a user to obtain additional HMI system information.

6. The system of claim 1, the HMI system information includes at least one of operating system parameters, machine function parameters, machine identification, user identification, and software components.

7. The system of claim 1, the HMI system is dispersed through a plurality of geographic locations.

8. A method for interactive diagnosis and solution implementation in an industrial environment, comprising:
receiving a diagnostic request;
retrieving HMI system data;
providing an instruction to a user to implement a solution for the HMI system;
receiving requesting diagnostic information and a solution to a problem from an external source; and
automatically applying the solution to the HMI system to resolve the diagnostic request.

9. The method of claim 8, receiving a diagnostic request is through an interactive voice response system.

10. The method of claim 8, the external source is a vendor software knowledge database.

11. The method of claim 10, if the vendor software knowledge database does not include the diagnostic and solution information, the method further comprising:
automatically contacting a technical support service for diagnostic and solution information.

12. The method of claim 10, further comprising:
contacting an external software vendor database for diagnostic and solution information;
determining if the external software vendor database includes the diagnostic and solution information; and
automatically communicating a diagnostic and solution information request to technical support personnel if the external software vendor database does not include the information.

13. The method of claim 8, further comprising:
communicating to a user through an IVR module if additional HMI system information is necessary to diagnose and solve the diagnostic request.

14. The method of claim 8, further comprising searching the external source for HMI system diagnostic information.

15. A computer readable medium having stored thereon computer executable instructions for carrying out the method of claim 8.

16. A system for diagnosing and correcting an HMI system, comprising:
means for receiving a user request to diagnose an HMI system;
means for gathering HMI system data;
means for transmitting the user request and HMI system data to an external source; and
means for receiving solution information from the external source and automatically applying the solution information to the HMI system.

17. The system of claim 16, further comprising:
means for interacting with a user through a IVR module.

18. The system of claim 16, further comprising:
means for accessing an external software vendor database.

19. The system of claim 16, further comprising:
means for automatically communicating the user request and HMI system data to technical support personnel.

* * * * *